Aug. 20, 1935.   F. P. STULL   2,011,835
BRAKE SERVICING MACHINE
Filed Feb. 13, 1933   2 Sheets-Sheet 2

Inventor
FAYE P. STULL
BY Richey & Watts
Attorneys

Patented Aug. 20, 1935

2,011,835

UNITED STATES PATENT OFFICE 2,011,835

BRAKE SERVICING MACHINE

Faye P. Stull, Youngstown, Ohio, assignor to
Daniel M. Foster, Youngstown, Ohio

Application February 13, 1933, Serial No. 656,556

13 Claims. (Cl. 90—12)

This invention relates to new and improved apparatus for removing material from the braking surfaces of automotive brake members. More particularly the invention relates to apparatus for removing material from brake drums and brake shoes.

In the manufacture of the vehicle it often happens that the brake shoes are not so aligned relative to the brake drums that all of the braking surface is available. This may be due to high spots in the lining; to the fact that the periphery of the shoes themselves are not concentric to the drum, or to the fact that the brake drums are not centered on the wheels. It also often occurs that the brake drum itself has high spots which have to be removed.

Previous attempts to provide machines for correcting the braking surfaces on brakes and brake drums have merely resulted in the use of cumbersome and expensive machinery for operating upon the brake shoes and in modified lathes for turning down the drums. It was previously necessary to remove the brake shoes from the vehicle for processing. After having been processed the shoe often could not be even then centered relative to the wheel axis and the brake drums because of discrepancies in the mounting of the brake shoe on the vehicle itself. These other types of servicing operations also entailed a considerable expenditure of time and labor which was not desirable hence the vehicle is often allowed to leave the plant of repair shop without the brakes functioning at their greatest efficiency.

In the present invention I have provided a light and portable machine which is easy to operate, and which is adapted to perform the foregoing servicing operations upon the brake members accurately and with a minimum of time and effort.

Broadly considered, my invention contemplates a means for supporting the machine upon a vehicle axle shaft or wheel spindle and which permits relative movement of the apparatus and the brake members; and means associated with the supporting means for determining the location and amount of material to be removed from the brake members; and adjustable means for removing such material from the brake members.

A further understanding of my invention may be had by the following specification together with the accompanying drawings which form a part of the specification.

In the drawings:

Figure 5 is a view in elevation of the gauge used in my invention with certain parts of the wheel brake drum and hub shown in section and phantom;

Figure 6 is a sectional view taken in a plane from the line 6—6 of Figure 5 looking in the direction of the arrows;

Figure 7 is an elevational view of a modified form of gauge.

Referring now to the drawings throughout which like reference characters have been used to disignate like parts.

Figure 1:
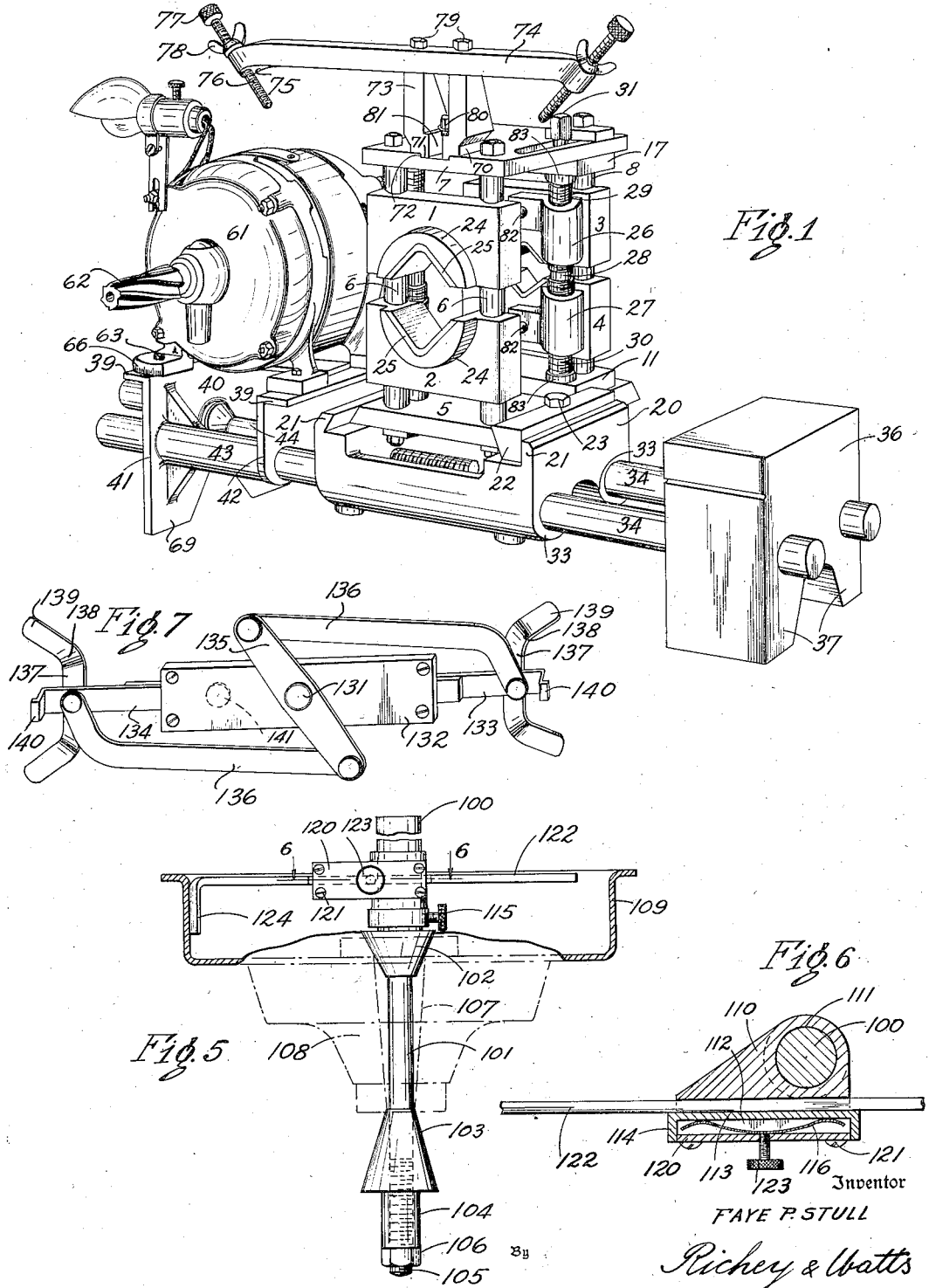
Figure 1 is a perspective view of the machine of my invention.
Figure 2:
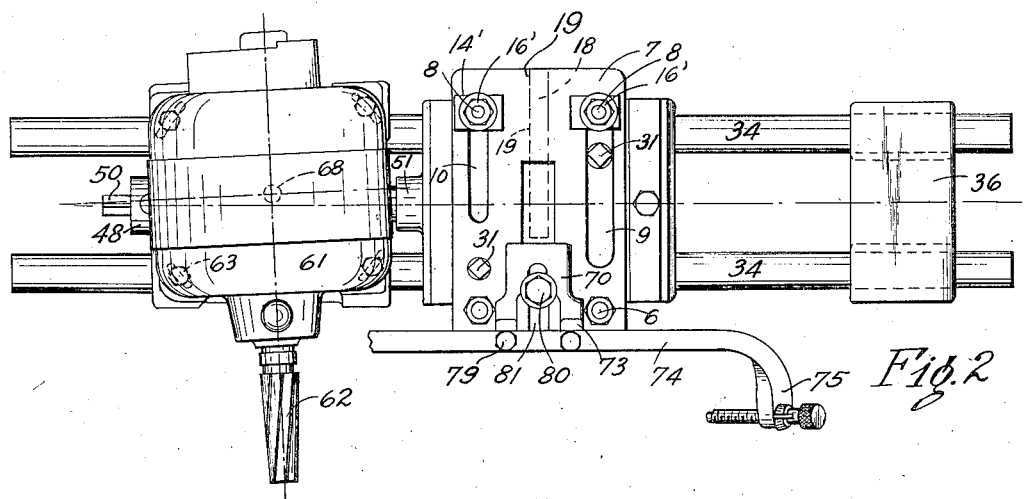
Figure 2 is a plan view thereof.

The supporting means comprises a chuck assembly which includes pairs of adjustable chuck jaws, 1 and 2 being the upper and lower front jaws respectively, and 3 and 4 being the upper and lower rear jaws respectively. The jaws are adapted to be supported by a base which comprises a chuck base plate 5. A pair of upwardly extending guide rods 6 are secured to the base and the jaws 1 and 2 are journalled thereon adapted for manual reciprocation. A top guide support or table 7 is secured to the tops of the guide rods 6, the guides 6 being immovable relative to either the base or the top.

The rear jaws are adapted for movement closer to or away from the front jaws and are provided with guide rods 8 similar to those for the front jaws. The lower ends of the guides 8 are immovably journalled in and extend through a guide plate 11 which rests on the base 5. The guide plate is provided with tongue 12 disposed in a groove 13 in the top of the base plate 5 adapted to maintain alignment of the guide plate upon the base. A similar guide plate 17 is provided for the upper ends of the guides 8 in which the guides 8 are immovably journalled and which in turn is provided with a tongue 18 disposed in a groove 19 in the underside of the top member 7. The ends of the guides 8 are of reduced diameter and extend through the guide plate 11 and through parallel slots in the base member 5. The extremities of the guides are threaded and are provided with a pair of clamping blocks 14 which extend laterally of the slots and the tops of the guides. Nuts 16 are threaded on the ends of the guides and are adapted to be tightened to securely clamp the guide plate 11 and guides in position upon the base 5. The slots permit the guides and guide plate, together with the chuck jaws, to be moved to and from the front jaws, when the nuts are loosened. The upper ends of the guides 8 are assembled in a guide plate 17 co-operative with the top guide support 7 in a like manner. They, the guides 8, are immovably journaled in the guide plate 17 which rests against the under side of the support 7, being provided with a tongue and groove 18 and 19 respectively in the guide plate and support. The support is provided with elongated parallel slots 9 and 10, similar to the slots in the base member 5 through which the reduced threaded ends of the guides 8 extend in a manner similar to the base plate 5. The guides 8 and plate 17 may be securely clamped to the support 7 by the nuts 16' which are threaded on the ends of the guides. Blocks 14' are interposed between the nuts and the top of the support 7 and extend laterally of the slots 9 and 10.

The entire chuck assembly by means of the base 5 is adapted for connection to a carriage 20. The base being formed to provide a dovetailed connection between the guides 21 of the carriage 20, and being held onto the carriage by a clamping gib 22. The gib 22 is secured to the carriage by a stud 23. The chuck jaws are provided with bosses 24 which are adapted to support jaw faces 25.

The front and rear sets of jaws are individually adjustable for clamping movement. Each jaw is provided with adjusting means for moving the jaws toward each other which includes levers 26 and 27 journaled upon pivot pins 82 which pins are screwed into the mid-portions of the jaws. The levers have threaded bosses upon their ends. The boss on the lever 26 for the top jaws may be provided with a left hand thread and the boss on the bottom lever 27 with a right hand thread. An adjusting screw 28 is provided with left and right hand threads 29 and 30 corresponding to the threads in the top and bottom lever bosses and is screw threaded into the bosses of the levers. The ends of the screw are of reduced diameter adjacent the threads and are rotatably journaled in the guide plates 17 and 11 respectively. Thrust collars 83 are disposed over the reduced ends abutting the shoulder formed by the reduced ends and the screw threads and interposed between said threads and the supporting plates. The upper extremity of the adjusting screw is provided with a squared extension 31 which extends through a slot 9 in the member 7 to permit the screw to be rotated by a wrench. Rotation of the screw draws the levers 26 and 27 toward or away from each other which movement is communicated through the pins 82 causing the chuck jaws to advance the jaws toward or away from each other for clamping or releasing engagement of an object therebetween. A similar adjusting mechanism is provided for the front jaws 1 and 2, the ends of the adjusting screw, however, being rotatably journaled in the base 5 and support 7 and provided with a squared extension 31 extending through an aperture in the support 7. The jaws may thus be individually adjusted to permit them to securely clamp a straight or tapered axle, a spindle of a wheel, or a mandrel as later described, the axis of each pair of jaws remaining in longitudinal alignment with the axis of the other pair at all times.

The carriage 20 is provided with a pair of oppositely disposed downwardly extending bored legs 33 through which are disposed rods 34. The rods are immovably held to the carriage by set screws 35 threaded into the legs and engaging the rods. The rods extend laterally on both sides of the carriage in a plane tangentially to a circle which is concentric to the axis of the chuck. A counter weight 36 is disposed on one end of the rods and is provided with legs 37 for supporting one end of the apparatus when not in use.

The other ends of the rods which extend from the chuck carriage 20 provide a bed for a motor driven cutter carriage 40. The carriage 40 includes a flanged base 39 which has a pair of downwardly extending portions 41 and 42 bridged by tubular guideways 43 adapted to be slidably journaled upon the rods 34 to permit the motor carriage to be reciprocated upon the bed toward and away from the chuck. A shifting screw 44 is provided for the motor carriage and comprises a threaded shaft which is rotatably journaled in a boss 45 on the motor carriage. A thrust collar 46 integral with the shaft engages the boss on the carriage to take the thrust to the left as viewed in the figures. A thrust collar 47 is threaded on the end of the screw 44 on the other side of the boss 45 and is locked in place by a lock nut 47'. The end of the screw 44 terminates in a squared portion 50 adapted for rotation by a wrench. A micrometer adjustment indicating member 48 is rotatably journaled on the surface of the collar 47 and may be locked to the collar 47 by a set screw 48' which extends into a groove 46' in the collar. The member 48 is provided with a flanged portion 49, calibrated to indicate fractions of an inch and adapted to be aligned with a mark or projection on the boss 45 for indicating the amount of longitudinal movement of the screw 44 and the cutter carriage. The adjustment may thus be released from the collar and turned independently of the screw 44 for a purpose hereinafter more fully described. The other end of the screw 44 is threaded into a boss 51 on the chuck carriage 20. Rotation of the screw 44 imparts thrust to the motor carriage 40 from the carriage 20 moving it away from or toward the chuck carriage depending upon the rotation of the screw. The amount of movement is indicated in thousands of inches by the micrometer adjustment indicator 49.

An electric motor 61 is supported on the surface or table 39. The shaft of the motor extends transversely relative to the bed rods 34 and carries a spirally grooved cutter 62. The motor is secured to the table 39 by studs 63 which extend through arcuate slots in the motor base and are threaded into the table 39. The edge of the motor base may be calibrated as at 66 to cooperate with a calibration 66 on the table adapted to indicate the angle of setting of the motor. A centrally disposed pin 68 may be provided upon the motor base and extends into a seat in the table 39 and acts as a pivot pin to assure accurate adjustment of the motor for angularity.

The carriage 40 may also be provided with legs 69 which, together with the legs 37, provide a stand for the device when not in operation. The counter weight 36 is adapted to substantially counter balance the weight of the motor and assembly on the opposite end of the bed.

Figure 3:
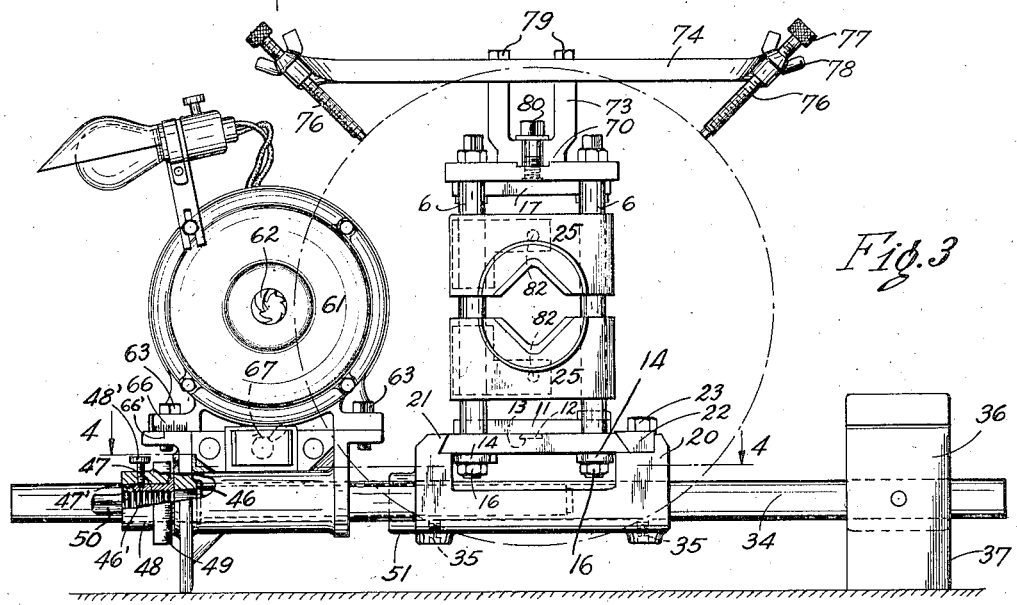
Figure 3 is an elevational view with the position of a brake shoe shown diagrammatically by dotted lines.
Figure 4:
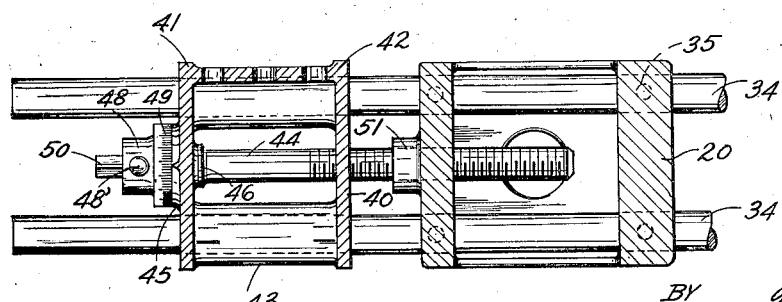
Figure 4 is a sectional view taken on the line 4—4 of Figure 3.

The brake shoe centering gauge is removably secured upon the top of the table 7 and includes a slotted base 70 having a tongue 71 disposed in a groove 72 in the table 7. A pair of arms 73 extend upward from the base and support a cross bar 74 which is bolted to the arms by studs 79. The ends of the bar 74 terminate in angular arms 75 which are threaded and have extending therethrough threaded brake shoe gauge points 76. The angularity of the arms 75 is so arranged that the threaded gauge points 76 extend and are adjustable in a radial line toward the axis of the chuck jaws. The end 77 of the gauge point 76 is knurled to permit movement and adjustment, and a winged lock nut 78 is disposed on the body of the point adjacent the arm 75 to permit the gauge point to be locked in adjusted position on the arm. The gauge base is secured to the support 7 by a stud 80 which extends through a slot 81. The slotted base and tongue and groove structure permit the gauge assembly to be moved on the table parallel to the chuck axis for adjustment purposes, or permits the assembly to be entirely removed therefrom. A light may be provided for illumination purposes and is supported upon the motor 61. A power line, not shown, may be connected to the motor and a switch 67 under the rear of the motor, shown in dotted lines in Figure 3, may be used to turn the motor on and off.

As shown in Figures 5 and 6, a combined drum gauge, cutter setting, and brake shoe gauge setting device is provided to cooperate with the apparatus and includes a mandrel 100 from which extends a shaft 101 of reduced diameter. A cone 102 is disposed on the shaft 101 and abuts the shoulder formed by the juncture of the mandrel and the shaft. Another outer cone 103 is slidably disposed on the shaft. A spacer 104 abuts the cone 103 and the end of the shaft is threaded at 105 and provided with an adjusting or clamping nut 106. The cones and shaft provide means whereby shaft 101 may be centered in the bore 107 of a wheel hub 108. The cone 102 engages the inner edge of the hub bore and the cone 103 engages the outer edge and is held in position in clamping engagement by the spacer 104 and nut 106. Centering of the shaft in the bore of the wheel hub also centers the mandrel 100 relative to a brake drum 109 which is carried by the hub 108. A gauge bar supporting body is rotatably disposed upon the mandrel 100 and includes a body 110 as best shown in Figure 6 having a bore 111 adapted to fit rotatably upon the mandrel. The body extends laterally from the bore 111 and is slotted to provide a groove 112 extending tangentially of the bore 111. A U shaped friction member 113 is disposed in the groove 112 with the legs 114 of the U engaging the extremities of the cap 120 which bridges the groove and is held in place by screws 121 to provide a chamber in which is disposed a spring 116 which is adapted to exert a pressure upon the friction member 113 guided in the groove. The gauge bar 122 extends through the groove between the friction member and the base of the groove and is held therein by frictional engagement with the friction member. Longitudinal movement of the bar is, however, permitted through the groove because of the spring-pressed nature of the friction member. A set screw 123 is provided in the cap 120 for varying the pressure of the friction member. The end 124 of the gauge member terminates in a substantially L shaped formation. The body of the gauge bar may be made of square stock or the like to prevent rotation of the same in the groove 112. The end 124 is adapted to extend parallel to the axis of the mandrel 100 and parallel to the inner surface of a brake drum 109. The gauge body may be locked to the mandrel by the set screw 115, which extends through a collar 115'.

The operation of the apparatus is as follows:

It being proposed to true the lining on the brake shoes of a vehicle, the wheel with the attached brake drum, is removed from the vehicle axle if it is a rear wheel, or from the spindle if it is a front wheel. The gauge member comprising the mandrel 100 and shaft 101 is seated in position in the hub of the wheel by removing the nut 106, spacer 104, and cone 103 and inserting the threaded shaft 101 through the hub bore from the inside of the wheel so that the cone 102 engages the inner edge of the hub bore. The cone 103 is then placed upon the shaft 101 followed by the spacer 104 and the nut 106 screw threaded on the shaft and tightened to securely hold and center the shaft and mandrel 100 relative to the center of the brake drum 109. The set screw 123 is adjusted to permit the gauge bar 122 to move in the channel or groove 112. The groove bar is then shifted until the L shaped end 124 engages the inner surface of the brake drum. The gauge is then rotated about the mandrel 100 with the end of the gauge bar 124 in contact with the surface of the drum to determine whether or not the drum is true and to also determine the smallest diameter of the drum if it is not true. After the diameter of the drum is determined the set screw 123 is tightened to securely hold the gauge bar in the gauge body. The device is then removed from the wheel.

The mandrel 100 of the gauge is then inserted in the jaws of the chuck assembly. The chuck being in place on the bed as shown in Figure 1. The front and rear chuck jaws are securely clamped to the mandrel. In this position the gauge may be rotated and the adjustable contacts 76 of the gauge bar 74 may be adjusted until they both contact with the end 124 of the gauge. The points are then locked in this position. At this point the ends of the gauge points 76 are both radially equidistant from the axis of the chuck. The gauge bar is then rotated to lie in a common plane with the cutter 62 on the motor 61. The motor carriage is then advanced toward the chuck by rotation of the screw 44 by means of a wrench on the square end 50 until the cutter blades contact with the end 124 of the gauge bar. Before operating upon the periphery of an internal brake shoe the motor is disposed, the cutter being of tapered formation, so that the surface of the cutter lies in a parallel plane to the brake shoe surface. The angularity of the cutter may be indicated by indicia 66 and 66' on the base of the motor and the table 39 respectively. After the cutter has been adjusted to contact with the gauge bar, the adjusting collar 48 is set to a zero indication by loosening the set screw 48' and rotating the collar relative to the screw 44 until the micrometer registers zero. The thumb screw on the collar is then tightened to lock it to the collar 47. The proper setting of the cutter and the gauge points relative to the chuck having thus been obtained through the medium of the gauge, the gauge is now removed from the chuck.

The stud 23 is loosened which releases the clamping gib 22 and the chuck is now bodily removed from the carriage 20. The chuck is then securely clamped to the vehicle axle stub with the jaws 1 and 2 on the inner side toward the differential housing, if it is a rear wheel. If it is a front wheel which is being operated upon it is clamped upon the spindle sufficiently tight to support the same but also loose enough to permit rotation of the chuck on the bearing seats. The device having been placed on the axle or spindle, the brake shoes are then properly aligned to assure that they are concentrically disposed to the axle, the gauge points 76 being used to determine when the best possible alignment has been obtained. The brake shoes being placed in position so that they contact with the gauge points 76 when the foot lever is in a normal inoperative position.

After it is assured that the brakes are properly adjusted concentrically with the axle the cutter is backed away from the chuck and the carriage together with the motor and bed are then slid onto the base 5 of the chuck which is clamped thereon in the proper position by tightening the screw 23 which clamps the gib 22 against the chuck base. The motor driven cutter 62 then lies along the surface of the brake shoes. As previously stated the pairs of chuck jaws 1—2 and 3—4 are movable relative to each other so as to permit the chuck to securely clamp the outer stubs of the axles or spindles of varying sizes and length.

After the device has been securely clamped to the chuck base the cutter is rotated about the spindle to assure that proper alignment has been obtained, after which the motor carriage is again set to its gauged position. The motor 61 is then energized by plugging the electric cord connected to the motor into a light socket and snapping the switch 67 under the rear of the motor. The motor having been started, the device is rotated steadily about the periphery of the brake shoe to remove high spots. The screw 44 is then rotated until the micrometer registers .008 to .010 of an inch movement of the cutter toward the chuck. The entire apparatus is now rotated in a clock-wise direction about the chuck axis with the cutter operating upon the brake shoes. The cutter will remove a cut of material from the brake shoes of .008 to .010 of an inch or any desired amount to provide the proper clearance between the shoes and drum. This provides a brake shoe surface which is parallel to the brake drum at all points about its periphery. After the desired amount of material is removed from the brake shoes, the cutter is backed from engagement with the shoe and the device is removed from the axle. The brake shoes are now trimmed and ready for the assembly of the wheel.

Although I have described the device as being used for trimming the brake shoe, it is also within the purview of this invention to use the same for trueing the brake drum. In this instance the gauge member is removed from the mandrel 100 and the gauge bar assembly on top of the support 7 is also removed and the chuck is assembled on the mandrel 100 after which the carriage is placed in position, the motor having previously been shifted on its base so that the outer cutting edge of the motor is parallel with the axis of the chuck rather than the inner cutting edge. The cutter 62 of the motor may be replaced with another type of cutter than that shown.

When the chuck is secured on the mandrel in the wheel, the bed carrying the motor driven cutter is then assembled with the chuck, as previously described for the assembly of the wheel, with the cutting member of the motor adapted to engage the inner surface of the brake drum. The cutter is first rotated about the drum without the motor being turned on until the lowest point drum or point of smallest diameter is determined, after which the motor may be energized and the cutter moved away from the chuck and rotated about the inside of the drum until the desired amount of material or high spots have been removed from the inner surface of the drum. After the drum has been trued the operations for trimming the brake shoes are carried out in a similar manner to that previously described.

In Figure 7, I have shown a modified form of gauge of the spreader type which may be used to replace the gauge of Figures 5 and 6. A mandrel similar to the mandrel 100 of the Figures 5 and 6 is provided directly opposite to the pivot 131 and supports an elongated body 132. A pair of gauge bars 133 and 134 respectively are reciprocably journalled in said body. A pivot 131 is provided on the body 132 and carries thereon a lever arm 135 fulcrumed at its center to the pivot and connected at its ends to a pair of links 136. The links 136 are pivotally secured to the gauge bars 133 and 134 spaced from their ends. A pair of U shaped supporting members 137 are also carried by the same pivot. The ends 139 of the members extend outwardly beyond the end of the gauge bar and are offset at 138. In operation the ends 139 of the supporting members 137 are spaced in contact with the free edge of the brake drum of the wheel with the mandrel extending away from the hub bore. The ends 139 resting upon the edge of the brake drum and being offset furnish a means of support for the gauge and permit the gauge bar ends 140 to extend into the interior of the drum. The gauge points are then moved outwardly to bridge the drum by grasping the same and actuating them outwardly until the points contact with the drum on the inner surface. Each gauge bar will move outward an equal distance due to the connection therebetween. At this point the diameter of the drum is indicated by the distance between the ends of the gauge bars which are locked in position by the set screw 141. The gauge is then removed from the drum and the mandrel secured in the chuck in the manner previously described for the other gauge. In this position the gauge may be rotated, the mandrel rotating in the jaws, until the ends 140 of the gauge bar are brought into contact with the gauge points 76 which are adjusted as previously described for the other gauge. The gauge points 140 are then rotated and the motor cutter adjusted to contact with the point in a similar manner.

Having thus described my invention, I am aware that numerous and extensive departures may be made from the specific structure shown without departing from the spirit and scope of the invention.

I claim:

1. In a brake lining trimming machine including a chuck for supporting the machine upon a wheel-axle or spindle, a bed supported by the chuck, a motor driven cutter carried by the bed, said chuck adapted to permit the machine to be rotated about the axis of the chuck center and engage the cutter with the periphery of the brake shoe, means supported by the carriage for centering the brake shoe during operation of the machine.

2. In a brake lining trimming machine, a chuck having gripping jaws adapted to grip the wheel-axle or spindle of a vehicle, a removable base carried by the chuck, a bed for the base, a motor driven cutter, a carriage for supporting the cutter, and adjustable longitudinally on the bed, means to move the carriage relative to the chuck, a counter weight on the bed on the opposite end from the motor, guide means carried by the chuck to maintain a correct operative position between the machine and the brake shoes during operation.

3. In a brake lining trimming machine, including a chuck having a base, a plurality of guides on the base, and a pair of gripping jaws disposed on the guides and adapted for gripping relation with a wheel-axle or the like, a bed said base being remountably disposed on the bed, a carriage adjustable longitudinally of the bed, a motor driven cutter supported thereon, and a counter weight supported by the bed, a gauge above the chuck to adjust the device for operative relation with and position a brake shoe for trimming the lining thereof, said chuck adapted to permit the machine to be rotated upon said axle to engage the cutter with the periphery of the brake shoe to remove a portion of the material of the shoe.

4. In a brake lining trimming machine, a chuck adapted to be clamped upon a wheel-axle shaft or spindle and including a chuck carriage, a plurality of supports extending from said carriage in parallel relation to each other, slidable chuck jaws journalled on said supports, adjusting screws for said jaws connected to the jaws to simultaneously move the jaws away from or toward each other and maintain the axis of the jaws fixed, a base for said carriage and detachably secured thereto, a bed for the base, a motor driven cutter, a carriage for the cutter disposed on said bed, and adapted for longitudinal movement relative to the chuck, means to move the carriage on the bed comprising a screw rotatably journalled in the motor carriage and screw threaded into the chuck carriage, an adjustment indicator for indicating the amount of movement of the motor carriage relative to the chuck disposed on said screw and adapted to be movable relative to the screw to permit the same to be set to a zero indication, and a counter weight on the other end, said chuck jaws adapted to permit the machine to be rotated on or about the axle or spindle to engage the cutter with the periphery of the brake shoe.

5. In a brake lining trimming machine, a chuck adapted to be clamped upon a wheel-axle shaft or spindle and including a base, a plurality of supports extending from said base in parallel relation to each other, slidable chuck jaws journalled on said base, adjusting screws for said jaws connected to the jaws to simultaneously move the jaws away from or toward each other and maintain the axis of the jaws fixed, a carriage for said base and detachably secured thereto, a bed for the carriage, a motor driven cutter disposed on said bed and adapted for longitudinal movement relative to the chuck, means to move the cutter on the bed comprising a screw rotatably jouralled in the bed and screw threaded into the chuck carriage, an adjustment indicator for indicating the amount of movement of the cutter relative to the chuck disposed on said screw and adapted to be movable relative to the screw to permit the same to be set to a zero indication, a counter weight on the other end of said bed, said chuck jaws adapted to permit the machine to be rotated on or about the axle or spindle to engage the cutter with the periphery of the brake shoe, a brake shoe engaging member supported by the chuck base on said supports and provided with a plurality of adjustable members adapted to be set to a predetermined position to engage the periphery of a brake shoe to permit the brake shoe to be centered relative to the chuck axis.

6. In a brake lining trimming machine, a chuck adapted to be clamped upon a wheel-axle shaft or spindle and including a chuck carriage, a plurality of supports extending from said carriage in parallel relation to each other, slidable chuck jaws journalled on said supports, levers pivotally journalled on said jaws, threaded bosses carried by said levers and adjusting screws disposed in said bosses and adapted to simultaneously move the jaws away from or toward each other and maintain the axis of the jaws fixed, a base for said carriage and detachably secured thereto, a bed for the base, a motor driven cutter, a carriage for the cutter disposed on said bed, and adapted for longitudinal movement relative to the chuck, means to move the carriage on the bed comprising a screw rotatably journalled in the motor carriage and screw threaded into the chuck carriage, an adjustment indicator for indicating the amount of movement of the motor carriage relative to the chuck disposed on said screw and adapted to be movable relative to the screw to permit the same to be set to a zero indication, and a counter weight on the other end, said chuck jaws adapted to permit the machine to be rotated on or about the axle or spindle to engage the cutter with the periphery of the brake shoe.

7. In a brake lining trimming machine, a chuck adapted to be clamped upon a wheel-axle shaft or spindle and including a base, a plurality of supports extending from said base in parallel relation to each other, slidable chuck jaws journalled on said base, adjusting screws for said jaws connected to the jaws to simultaneously move the jaws away from or toward each other and maintain the axis of the jaws fixed, a carriage for said base and detachably secured thereto, a bed for the carriage, a motor driven cutter disposed on said bed and adapted for longitudinal movement relative to the chuck, means to move the cutter relative to the bed comprising a screw rotatably journalled in the cutter carriage and screw threaded into the chuck carriage, an adjustment indicator for indicating the amount of movement of the carriage relative to the bed disposed on said screw and adapted to be movable relative to the screw to permit the same to be set to a zero indication, and a counter weight on the end of the bed, said chuck jaws adapted to grip an axle or spindle and also a gauge for determining the diameter of a brake drum and to permit the machine to be rotated on or about the axle or spindle to engage the cutter with the periphery of the brake shoe, a brake shoe engaging member supported by the base on said supports and provided with a plurality of adjustable members adapted to be set to a predetermined position to engage the periphery of a brake shoe to permit the brake shoe to be centered relative to the chuck axis.

8. A brake lining trimming machine including a chuck, a base for the chuck, a frame supported by the base, gripping jaws guided by the frame adapted for gripping relation with a wheel-axle or the like, a bed, said base dismountably disposed on the bed, a carriage adjustable longitudinally of the bed, a motor driven trimmer supported by the carriage, a gauge to adjust the device for operative relation with and position, a brake shoe for trimming the lining thereof, said chuck adapted to permit the machine to be rotated upon said axle to engage the trimmer with the periphery of the brake shoe to remove a portion of the material of the shoe.

9. In a brake lining trimming device, a carriage, a motor driven trimmer supported by the carriage, and a carriage supporting multi-part chuck on a frame extending at right angles to the carriage, said frame being adjustable transversely on the carriage, the chuck parts being simultaneously adjustable along the frame toward and away from the carriage and toward and away from each other, said chuck parts being shaped to support the carriage on an axle or spindle of a vehicle for rotation thereabout.

10. In an apparatus for servicing a brake member of an automotive vehicle, a chuck adapted to be mounted on a wheel shaft or spindle of the vehicle and including spaced sets of jaws adapted to clamp said shaft, said sets being adjustable toward and away from each other, means associated with the chuck for determining the location and amount of material to be removed from a brake member, adjustable means supported by the chuck for removing such material.

11. In an apparatus for servicing a vehicle brake member, a chuck for gripping a wheel-axle or spindle, means supported by the chuck for removing material from a brake member, said chuck including individually adjustable sets of jaws, each set comprising jaws movable toward or away from each other, said sets being movable toward or away from each other.

12. In a brake lining trimming machine, a chuck having gripping jaws adapted to grip the wheel axle or spindle of the vehicle, a removable base carried by the chuck, a bed for the base, a motor driven trimmer, a carriage for supporting the trimmer adjustable on the bed transversely relative to the wheel axle, means to move the carriage relative to the chuck, guide means carried by the chuck to center the brake-shoes and to maintain a correct operative position between the machine and the brakeshoes during operation.

13. In a machine for truing the braking surfaces of a vehicle friction brake member, a chuck including gripping jaws adapted to be clamped about a vehicle wheel spindle or axle, a bed removably carried by the chuck and adapted for longitudinal adjustment relative to a vehicle spindle or axle, a carriage adjustably supported by the bed and extending transversely on both sides of the axle movable transversely relative to the vehicle spindle, a motor driven brake lining surfacing tool supported by the carriage and adapted upon rotation of the chuck about or with the spindle or axle to be moved circumferentially about the surfaces of the wheel brake members, a screw threaded shaft supported by the carriage and connected to the bed adapted on rotation to move the carriage on the bed transversely to the axes of the vehicle spindle or wheel to engage the surfacing tool with the friction surfaces of the brake member or members for removal of a portion thereof.

FAYE P. STULL.